US009752607B2

(12) United States Patent
Muskat

(10) Patent No.: US 9,752,607 B2
(45) Date of Patent: Sep. 5, 2017

(54) RETENTION PIN AND METHOD OF FORMING

(71) Applicant: Rolls-Royce North American Technologies, Inc., Indianapolis, IN (US)

(72) Inventor: James C. Muskat, Mooresville, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 593 days.

(21) Appl. No.: 14/204,447

(22) Filed: Mar. 11, 2014

(65) Prior Publication Data

US 2014/0327213 A1    Nov. 6, 2014

Related U.S. Application Data

(63) Continuation-in-part of application No. 14/101,814, filed on Dec. 10, 2013, now Pat. No. 9,028,188.

(Continued)

(51) Int. Cl.
*F04D 29/08* (2006.01)
*F16B 19/04* (2006.01)
(Continued)

(52) U.S. Cl.
CPC .............. *F16B 19/04* (2013.01); *B21J 15/08* (2013.01); *B23K 11/0066* (2013.01); *B23K 31/02* (2013.01); *F01D 9/023* (2013.01); *F01D 11/005* (2013.01); *F02C 7/28* (2013.01); *B23K 2201/001* (2013.01); *F05D 2230/23* (2013.01); *F05D 2240/57* (2013.01)

(58) Field of Classification Search
CPC .......... F16B 19/04; F16B 19/06; F04D 29/08; F01D 11/00; F01D 11/005
See application file for complete search history.

(56) References Cited

U.S. PATENT DOCUMENTS 2,268,416 A    12/1941 Nelson
2,413,370 A    12/1946 Palmer
(Continued)

FOREIGN PATENT DOCUMENTS

EP    1728569 A1    12/2006
GB    1353219 A    5/1974

OTHER PUBLICATIONS

International Search Report PCT/US2013/072928 mailed on Oct. 6, 2014.

(Continued)

*Primary Examiner* — Michael P Ferguson
(74) *Attorney, Agent, or Firm* — Fishman Stewart PLLC

(57) ABSTRACT

A retention pin assembly may include a stud having a head, a shaft, and a deformable end. The shaft may include a stepped surface having a greater diameter than the deformable end. The assembly may include a support member having an opening for receiving the deformable end. The support member may include a pocket. The stepped surface of the shaft may position the stud in relation to the support member. The deformable end of the stud may be operable to be melted to form a mechanical retainer within the pocket without forming a metallurgical joint between the stud and the pocket.

17 Claims, 3 Drawing Sheets

Related U.S. Application Data

(60) Provisional application No. 61/780,746, filed on Mar. 13, 2013.

(51) Int. Cl.

| | | |
|---|---|---|
| *F01D 9/02* | (2006.01) | |
| *F01D 11/00* | (2006.01) | |
| *F02C 7/28* | (2006.01) | |
| *B23K 11/00* | (2006.01) | |
| *B23K 31/02* | (2006.01) | |
| *B21J 15/08* | (2006.01) | |
| *B23K 101/00* | (2006.01) | |

(56) References Cited

U.S. PATENT DOCUMENTS

| | | | |
|---|---|---|---|
| 2,638,525 A | 5/1953 | Candy | |
| 3,279,517 A | 10/1966 | Logan | |
| 3,405,594 A * | 10/1968 | Falcioni | B21J 15/02 29/512 |
| 3,481,634 A | 12/1969 | Rondeau | |
| 3,854,030 A | 12/1974 | Roye | |
| 3,905,173 A | 9/1975 | Gerken | |
| 4,439,661 A | 3/1984 | Doyle et al. | |
| 4,614,855 A | 9/1986 | Hinden | |
| 4,855,561 A | 8/1989 | Hinden | |
| 5,393,164 A | 2/1995 | Renner et al. | |
| 5,579,986 A | 12/1996 | Sherry et al. | |
| 5,797,723 A | 8/1998 | Frost et al. | |
| 6,176,662 B1 | 1/2001 | Champney et al. | |
| 6,205,625 B1 | 3/2001 | Kato | |
| 6,241,442 B1 | 6/2001 | Schaty et al. | |
| 6,431,555 B1 * | 8/2002 | Schroder | F01D 11/005 277/628 |
| 6,497,543 B1 | 12/2002 | Lyons | |
| 6,875,947 B2 | 4/2005 | Sichtermann et al. | |
| 6,895,757 B2 * | 5/2005 | Mitchell | F01D 11/005 60/753 |
| 7,227,096 B2 | 6/2007 | Barton | |
| 7,364,394 B2 | 4/2008 | Ramasamy | |
| 7,452,171 B2 | 11/2008 | Albrecht et al. | |
| 7,549,845 B2 | 6/2009 | Uwami et al. | |
| 7,654,782 B2 | 2/2010 | Nilsen et al. | |
| 7,780,174 B2 * | 8/2010 | Wunderlich | F01D 9/023 277/632 |
| 2004/0164124 A1 | 8/2004 | Lundstrom et al. | |
| 2005/0102994 A1 * | 5/2005 | Lepretre | F01D 11/005 60/39.01 |
| 2006/0177284 A1 * | 8/2006 | Keener | F16B 19/06 411/501 |
| 2011/0142566 A1 | 6/2011 | Drexler et al. | |

OTHER PUBLICATIONS

International Search Report PCT/US2014/023852 mailed on Oct. 6, 2014.

* cited by examiner

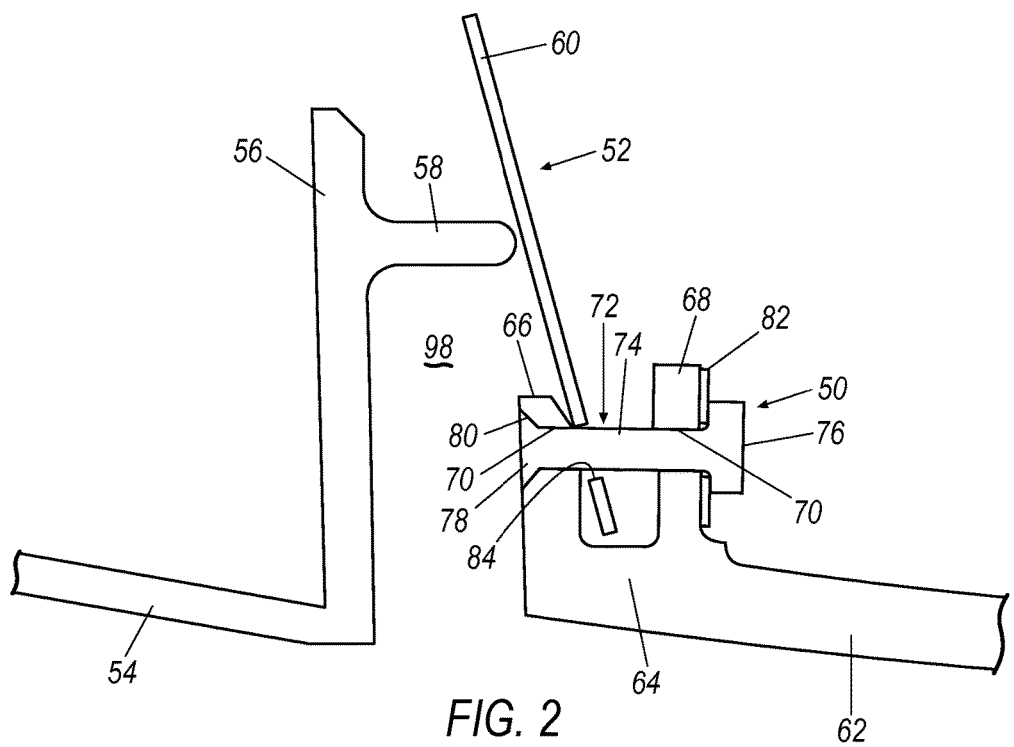
FIG. 2
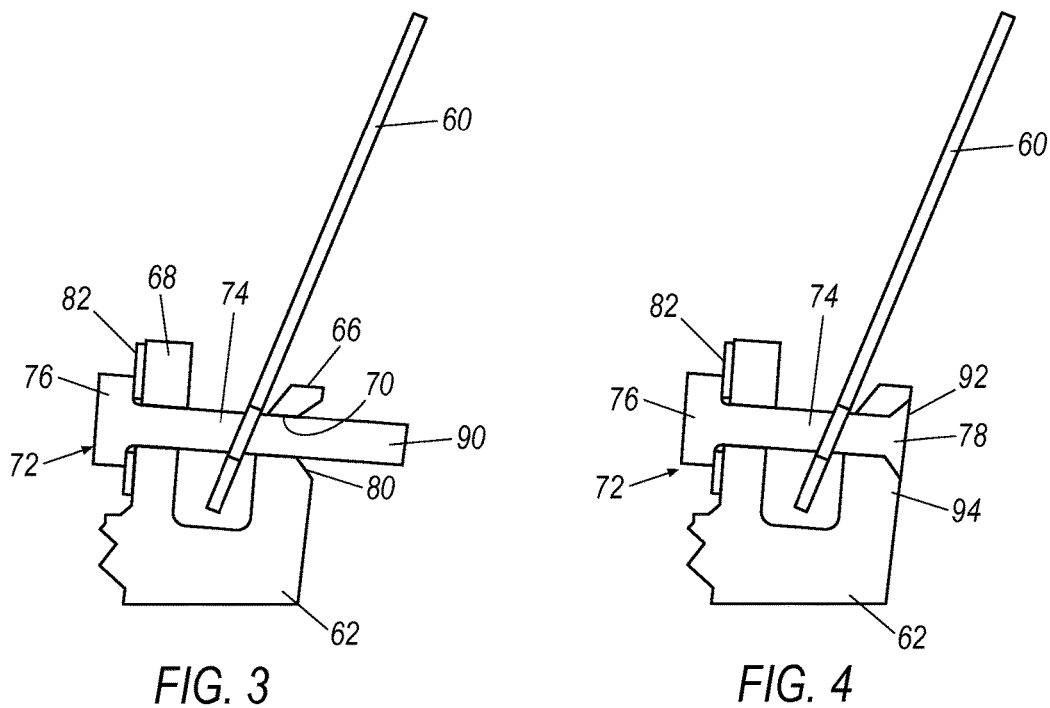
FIG. 3
FIG. 4

RETENTION PIN AND METHOD OF FORMING

CROSS-REFERENCE TO RELATED APPLICATIONS

This application is a continuation-in-part of U.S. patent application Ser. No. 14/101,814, filed Dec. 10, 2013, and claims priority to U.S. Provisional Patent Application No. 61/780,746 filed Mar. 13, 2013, the contents of which are hereby incorporated in their entirety.

GOVERNMENT RIGHTS

This application was made with government support under N00019-96-C-0176 awarded by the United States Navy. The government has certain rights in the application.

FIELD OF TECHNOLOGY

An improved retention pin, and more particularly, a pin and method of forming a pin assembly that uses a melt in a pocket without a metallurgical joint having been formed.

BACKGROUND

Traditionally mechanical fasteners are used to mechanically link two or more articles together. Mechanical fasteners come in various shapes and sizes and they have a variety of constructs. The type of construct depends in part on the environmental conditions in which the fastener system must operate. Some may operate in high stress, shear, compression or tension conditions, and some may operate in high temperature, low temperature, or just ambient temperature conditions. Thus, depending on the circumstances, the design of fastener system may be changed.

One style of mechanical fastener includes rivets. A problem with rivet type fasteners is that rivet heads have been known to be liberated into engines, causing damage. This is because the rivet construct may not have tightly controlled material strength and structural integrity. This in part may be because the quality of the rivet is subject to the quality of work of the operator who forms the rivet. If a rivet has been unknowingly overworked, it may not have the fatigue life that was assumed. Thus, rivet constructs are not dependable or desirable to use in engines, or other locations or machinery, where potentially causing damage to the machinery is an issue.

It would be helpful to provide an improved mechanical joint. Such a joint could be formed by a welder who melts a retention pin only into a pocket. The welder can watch the molten metal flow into the pocket to know that he has finished the forming operation. The fatigue properties of the melt-formed pin may be the same as the solution heat treated form of the pin material.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

FIG. 2 illustrates a side sectional view of a seal assembly having a pinned connection;

FIG. 3 illustrates a side sectional view of a retention pin assembly, where a joint has not yet been welded;

FIG. 4 illustrates a side sectional view of the retention pin assembly, where a melt has been formed without creating a metallurgical joint

DETAILED DESCRIPTION

An exemplary embodiment includes a retention pin and method of forming a seal assembly which may be used where seals are employed. Such a pin could be used on any conceivable assembly, not just to retain leaf seals on turbine engine nozzle guide vanes, the example shown herein. Thus, it will be appreciated that the seal assembly, and methodology, could be used in other applications, for example, in machinery where it is helpful to provide an improved joint using a retention pin, particularly where it is desirable to not use a rivet assembly.

Traditionally a rivet could be used to secure multiple members together. However, rivets are generally forbidden from being used near the main flow path of gas turbine engines. Thus, an exemplary embodiment overcomes this problem by providing a method and construct that has the requisite retentive functionality of a rivet without a rivet construct being used. This is accomplished by providing a headed pin that has a distally opposed smaller diameter end that is melted by a welder. The molten pin metal flows into a countersink or bore-like pocket in the underlying component. The molten pin metal immediately cools to fill the pocket. Excess solidified metal can then be ground flush with the surface into which the pocket was formed if desired for clearance with the environment.

Another exemplary embodiment provides a retention pin assembly having molten metal that has quickly cooled when it contacted the underlying part's surface, thereby precluding any melting of the underlying surface. This produces a mechanical joint rather than a metallurgical joint. The pin is free to rotate because there is no metallurgical joint. This also makes it very simple to remove the pin, such as would be done during an engine overhaul, without altering the underlying component; a simple drill is used to remove the pin material in the pocket and the pin can be pulled out of the components that it was retaining together. Thus, a serviceable retention pin assembly is contemplated.

Figure 1:
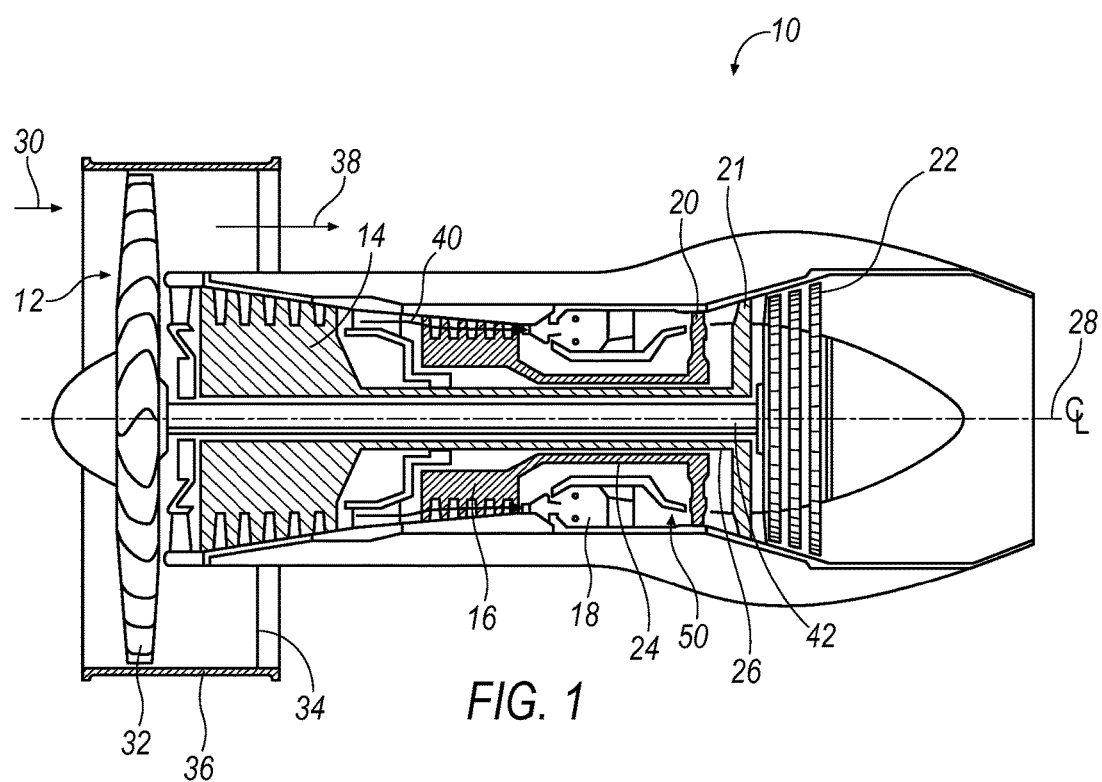
FIG. 1 illustrates a schematic view of a gas turbine engine.

FIG. 1 illustrates a gas turbine engine 10, which includes a fan 12, an intermediate pressure compressor and a high pressure compressor, 14 and 16, a combustor 18, a high pressure turbine, an intermediate pressure turbine, and a low pressure turbine, 20 and 21 and 22, respectively. The high pressure compressor 16 is connected to a first rotor shaft 24 while the intermediate pressure compressor 14 is connected to a second rotor shaft 26 and the fan is connected to a third rotor shaft 42. The shafts extend axially and are parallel to a longitudinal center line axis 28.

Ambient air 30 enters the fan 12 and is directed across a fan rotor 32 in an annular duct 34, which in part is circumscribed by fan case 36. The bypass airflow 38 provides engine thrust while the primary gas stream 40 is directed to the combustor 18 and the high pressure turbine 20. The gas turbine engine 10 includes an improved retention pin assembly 50 for retaining a leaf seal that is operable to direct hot combustion gases onto rotor blades of the turbine 20.

With reference to FIG. 2, a retention pin assembly 50 can be used with a leaf seal assembly 52 for use in hot combustion gas pathways of a gas turbine engine 10. It will be appreciated that the pin assembly 50 may be used in other applications where it is desirable to provide an improved seal. The seal assembly 52 includes a first member 54 having an upwardly extending wall 56. A depending member 58 extends from the wall 56 and forms a rest for a leaf seal 60 to engage.

The seal assembly further includes a base 62 with a u-shaped portion 64 having a first upwardly extending support 66 and a second upwardly extending support 68. The supports are shown integral with the base 62. The base 62 and the member 54 are made of metal that is operable in gas turbine engine type environments. The supports 66 and 68 have apertures 70 for receiving a shaft of a retention pin. The apertures 70 are slightly larger than the diameter of the shaft so as to permit movement of the shaft relative to the supports 66 and 68.

The pin assembly 50 includes a retention pin 72 having a shaft 74, a head 76, and a melted end 78. The melted end 78 resides loosely within a conic shaped void 80 that is formed within the support 66. It will be appreciated that the void's shape can vary, and could include other shapes such as, but not limited to, round, stepped, or elliptical. Washers 82 can be provided adjacent the head 76. The leaf seal 60 is retained at an aperture 84 by the shaft 74 of the pin 72.

FIG. 3 illustrates a first step in the process of manufacturing a retention pin assembly 50 having a melt end 90 to form the locking feature of the pin 72 relative to the base 62. The first step includes providing a leaf seal 60 and inserting a pin 72 through an aperture 70 in support arm 66. The pin 72 is then passed through the aperture 84 of the leaf seal 60. An opposing end 90 of the pin 72 includes an elongated portion that passes through aperture 70. A sufficient amount of material at the melt end 90 of the pin 72 should be present so as to provide a sufficient amount of volume of melt 78 that consumes the conic void 80 in the support 66.

FIG. 4 illustrates the next step of forming the assembly where the retention pin 72 now becomes loosely, mechanically joined to the support arm 66 and 68. This is accomplished by heating, via welding or some other means, the melt end 90 of the pin 72. This melting step may continue until a melt 78 or pool of material fills the conic shaped void 80. The welding does not, however, cause any metallurgical displacement or connection between the support 66 and the pin 72. Once the pool of melted material 78 is cooled, the pin 72 is not rigidly affixed to the base 62. Instead the pin 72 may be able to rotate within the aperture 70. As shown in FIG. 4, the melt 78 has smooth exterior surface 92 that is nearly flush with the surface 94 of the base 62. This may be accomplished by use of a finishing step, such as grinding, so as to provide a smooth surface to enhance clearance within passageway 98 (see FIG. 2.). The pin 72 can be constructed of any material that can be melted using a welder. The melt-formed pin head material can have the same material properties as the remainder of the pin that was not melted if the pin was in the solution heat treated condition prior to weld melting of the smaller end.

The retaining pin 72 has a residual, axial load after forming. The residual load results from the thermal expansion of this pin 72 during melting, with negligible expansion of the underlying components being retained together due to their relatively large mass relative to the pin, followed by thermal contraction of the pin upon release from heat input from the welder. The net result is a small load. This axial load is customizable in that the length, cross sectional area, and material conductivity of the pin 72 are customizable features that can be exploited to limit heat input into the pin, thus allowing a tailoring of expansion of the pin with resulting tailoring of the residual axial load in the pin following cool down.

It will be appreciated that the retention pin 72 is customizable in size to accommodate any requirement. The melted material 78 completely fills the pocket or void 80, thereby maximizing the use of the material to provide retention.

The voids 80 into which the pin 72 is melted can be undercut, such that the melted portion 90 cannot be liberated even in the event that the pin were to be severed or worn-through during fielded operation. In an alternative embodiment, both ends of the pin 72 could be melted into opposing pockets if desired, and undercuts could be utilized on both ends to preclude liberation of either of the headed ends of the pin.

Figure 5:
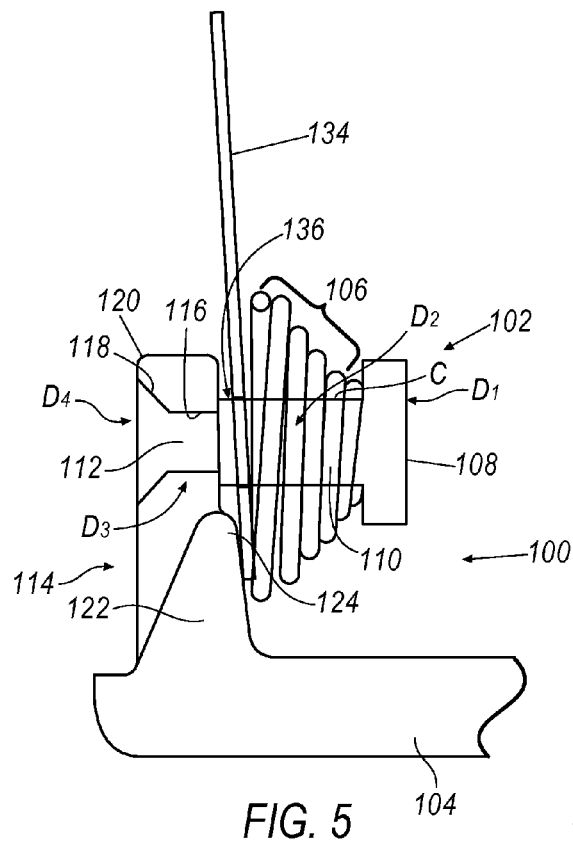
FIG. 5 illustrates a side sectional view of a retention pin assembly according to another implementation.

FIG. 5 illustrates a side sectional view of a retention pin assembly 100 according to another implementation. The assembly 100 may generally include many of the same components of the retention pin assembly 50 described above, but may include several modifications. The assembly 100 may have a retention pin 102, a base 104, and a bias member 106.

The retention pin 102 may comprise a head 108, a shaft 110, and a deformable end 112. While the pin 102 is described with a circular exterior, it will be appreciated that alternative configurations are contemplated (e.g., triangular, quadrilateral, pentagonal, etc.). As shown in FIG. 5, shaft 110 may be a stepped shaft or otherwise have a greater radial extent in relation to the longitudinal center line axis 28 than the shaft 74 illustrated in FIGS. 2-4. That is, the stepped shaft 110 may have a larger diameter or cross-section than the deformable end 112. In other words, the retention pin 102 may comprise at least three (3), and in some cases four (4), diameters along the longitudinal length of the pin 102. The head 108 may have the greatest diameter $D_1$ or radial extent, while the shaft 110 may have a diameter $D_2$ less than the head 108 but greater than the diameter $D_3$ of the deformable end 112. Furthermore, the deformable end 112, once secured (e.g., by melting), may include a fourth diameter $D_4$ which is greater than the diameter $D_3$ of the deformable end 112. The relationship between the stepped shaft 110 diameter $D_2$ and the diameter $D_4$ of the deformable end 112 once melted may depend on the characteristics and traits of the retention pin assembly 100, e.g., load requirements, design, etc. In some implementations, the diameter $D_4$ of the deformable end 112 once melted may be greater than the diameter $D_1$ of the head 108.

The larger step in the shaft 110 as compared to shaft 74 may offer greater service life of the pin 102 when subjected to wear as the stepped shaft adds stronger structural stability to the pin 102. Furthermore, the stepped shaft 110 may include a wear resistant coating C such as, but not limited to, a hard coating material, so as to improve the wearability of the pin 102. Additionally or alternatively, the pin 102 may be hardened, for example via an inductive and thus highly pinpointed heating, as well as via a subsequent rapid cooling. The hardening thereby increases wear resistance, for instance of the shaft 110, whereby the life expectancy thereof can be extended.

The retention pin 102 may be received and subsequently secured in the base 104. The base 104 may include an upwardly extending or vertical support member 114 (e.g., extending substantially perpendicularly from the base 104), which may be integral with the base 104. The support member 114 includes an aperture 116 for receiving the retention pin 102. The aperture 116 may be slightly larger than the deformable end 112 for receiving the retention pin 102, yet smaller than the diameter of the stepped shaft 110. As such, the deformable end 112 of the retention pin 102 may be received in the aperture 116 of the support member 114, and the stepped shaft 110 may contact or abut against the support member 114 when fully inserted. The stepped surface of the shaft 110 may extend across the longitudinal length L of the pin 102 from the head 108 for a predefined distance such that the pin 102 stops at a predetermined axial position, e.g., when the stepped shaft 110 abuts against the support member 114. Thus, the stepped shaft 110 may serve to position the pin 102 in place as the stepped shaft 110 comes into contact with the support member 114. Accordingly, the stepped shaft 110 may eliminate the requirement of a second support member (e.g., support member 68) to position and support the pin 102 near the pin head 108. As such, the weight of the base 104 and the overall pin assembly 100 may be less as compared to pin assembly 50. Furthermore, the removal of a second support may yield more surface area along the base 104 and thereby increase the cooling capabilities of the base 104.

As provided above, the pin 102 may be secured to the support member 114 via melting the deformable end 112 in a conic shaped void 118 that is formed within the support member 114. The void 118 may be formed in the support member 114 on a side distal from the pin head 108. As shown, the void 118 may open at the mouth of the aperture 116 such that the void 118 concentrically surrounds the aperture 116. A sufficient amount of material at the deformable end of the pin 102 should be present in order to provide a sufficient amount of volume that consumes the conic void 118 in the support member 114. Melting the deformable end 112 (e.g., via welding) does not cause any metallurgical displacement or connection between the support member 114 and the pin 102, but rather forms a mechanical joint between the pin 102 and the support member 114. As such, the pin may be able to rotate within the aperture 116. Additionally, the end or foot of the deformable end 112 after melting/cooling may be smoothed or finished, for example by grinding, to provide a smooth exterior surface.

Consequently, the pin 102 may be retained and secured to the support member 114 via the deformable end 112 on the one hand and the stepped shaft 110 on the other. That is, the pin 102 is secured in place with respect to the support member 114 as a result of deforming the deformable end 112 to have a greater diameter $D_4$ than the aperture 116, and the stepped shaft 110 configured with a greater diameter $D_2$ than the aperture 116. Thus, as mentioned above, the pin 102 itself functions as a positioning device.

The support member 114 may comprise at least in part a single crystal material. For example, the support member 114 may include two sections in which a first section 120 arranged in an upper portion of the support member 114 may be composed of a single crystal material whereas a second section 122 arranged on a lower portion of the support member 114 may be composed of a metallic heat resistant material. In this example, the second metallic section 122 may be made integral with the base 104 and the first single crystal section 120 may be coupled thereto. Alternatively, the support member 114 may comprise a single, uniform material. The support member 114 may include an axially protruding nub 124 (e.g., in relation to the longitudinal center line axis 28) disposed below the aperture 116 on a side opposite the conic shaped void 118, e.g., formed on the side of the support member 114 proximal to the pin head 108. The nub 124 may protrude substantially orthogonally from the support member 114 in the direction of the pin head 108. Alternatively, the support member 114 may be configured in the manner as illustrated in FIGS. 2-4 (e.g., designed as support 66).

Additionally, the pin assembly 100 may include a bias member 106 arranged coaxially around the stepped shaft 110. The bias member 106 may include, for example, a helical or coiled spring disposed between the pin head 108 and the support member 114. As with the shaft 110, the pin head 108 may likewise have a stepped surface to provide sufficient surface area for the bias member 106 to contact and hold in place. Accordingly, the retention pin 102 may rotate concentrically within the bias member 106. As with the stepped shaft 110, the bias member 106 may include a wear resistant coating C so as to extend the service life of the bias member 106.

Figure 6:
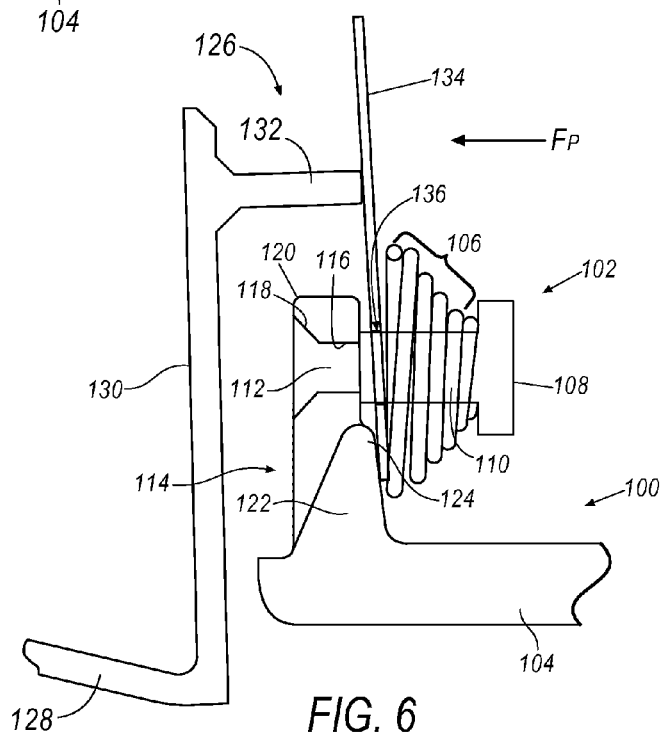
FIG. 6 illustrates a side sectional view of a seal assembly having a pinned connection according to the implementation of FIG. 5.

FIG. 6 illustrates the retention pin assembly 100 used in conjunction with a leaf seal assembly 126, such as the leaf seal assembly 52 described above. The leaf seal assembly 126 may include a first member 128 having an upwardly extending wall 130. A depending member 132 extends from the wall 130 and forms a rest for a leaf seal 134 to engage. The leaf seal 134 includes an aperture 136 for receiving the retention pin 102. The leaf seal aperture 136 may include a diameter slightly larger than the diameter $D_2$ of the stepped shaft 110, thereby allowing the leaf seal 134 to pivot about the shaft 110. As with the shaft 110, the aperture 136 may likewise include a wear resistant coating C to extend the service life of the leaf seal assembly 126.

As shown in FIG. 6, the leaf seal 134 is oriented substantially vertically on the pin 102. The vertical orientation of the leaf seal 134 improves the seal between leaf seal 134 and the opposing first member 128 as the leaf seal 134 is already in contact with depending member 132 in low pressure and/or assembly conditions. The leaf seal 134 may prevent high temperature gases and/or fluids from thermally engaging the single crystal material section 120 of the support 114, which may suffer cracking or fracturing upon exposure to high temperatures. Additionally, the substantially vertical orientation permits more surface area of the leaf seal 134 to contact the depending member 132 thereby forming a tighter seal. Moreover, the vertical orientation of the leaf seal 134 further enables the leaf seal assembly 126 to conform to non-planar environments, e.g., the frustrum of a cone. The lowermost portion of the leaf seal 134 may come into contact with the nub 124 when the leaf seal 134 is at its vertical most orientation. As such, the nub 124 may act as a stop for the leaf seal 134.

Furthermore, the bias member 106 may facilitate sealing of the leaf seal assembly 126, for instance during cold engine starts or low pressure conditions. The bias member 106 may be calibrated with enough force to naturally bias the leaf seal 134 against the depending member 132. That is, the bias member 106 may guide the leaf seal 134 in the direction of the depending member 132 before the force of a pressure acts on the leaf seal 134 in the direction of the first member 128. Accordingly, the bias member 106 works in conjunction with the force exerted on the leaf seal 134 via pressure thereby creating a stable seal for the leaf seal assembly 126. However, the magnitude of the force exerted by the bias member 106 may not be so great as to prevent the leaf seal 134 from pivoting on the stepped shaft 110. In other words, the leaf seal 134 may overcome the opposing biasing force exerted by the bias member 106.

It will be appreciated that the retention pin assembly 102 and the leaf seal assembly 126 are not limited to the illustration as shown, and may be configured as doublets, triplets, etc. For instance, the base 104 may include a second retention pin assembly (not shown) including the same components as described with respect to retention pin assembly 100. That is, the base may include a second support (not shown) having an opening for receiving a second pin (not shown). The second pin may be configured as pin 102, e.g., including a stepped shaft, wear resistant coating, hardened surface, etc. Alternatively, the second pin may be configured as retention pin 72. Furthermore, two or more bases 104 may be combined to form a larger composite unit.

Moreover, a method of forming a mechanical joint may include providing a pin 102 having a head 108, a shaft 110, and a deformable end 112. The shaft 110 may have a stepped surface with a greater diameter or cross-section than the deformable end 112. The pin 102 may include a wear resistant coating, and/or the stepped surface of the shaft 110 may be hardened, e.g., via a heat treatment. Further, a base 104 may be provided having a support member 114 and an aperture 116 for receiving the pin 102. A void 118 may be formed in the support member 114 on a side disposed distally from the pin head 108. The void 118 may be, for instance, conic shaped.

Next, the deformable end 112 of the pin 102 may be inserted through the aperture 116 of the support member until the stepped surface of the shaft 110 stops or otherwise impedes further insertion. As such, the stepped shaft 110 functions as a positioning device thereby positioning the pin 102 in a predefined position with respect to the support member 114. Likewise, the deformable end 112 may be formed with a predetermined longitudinal length with respect to the stepped surface of the shaft 110, such that a sufficient amount of material is present for subsequent melting to consume the conic shaped void 118.

Once the pin 102 is fully inserted and in place, the pin 102 may be secured to the support member 114 via melting (e.g., by welding) the deformable end 112 in the void 118. The melted material of the deformable end 112 may completely fill the void 118, thereby maximizing the use of the material to provide retention. However, the melting forms a mechanical retainer within the void 118 without forming a metallurgical displacement or connection between the support member 114 and the pin 102.

The mechanical joint may be used in connection with the leaf seal assembly 126, described above. For instance, a bias member 106 may be arranged coaxially on the shaft 110, and a leaf seal 134 may be pivotally mounted on the shaft 110.

Accordingly, it will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

With regard to the processes, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many implementations and applications other than the examples provided would be apparent upon reading the above description. It is anticipated and intended that future developments will occur in the arts discussed herein, and that the disclosed systems and methods will be incorporated into such future implementations. In sum, it should be understood that the invention is capable of modification and variation.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A retention pin assembly comprising:
    a stud including a head, a shaft, and a deformable end disposed at a distal end thereof, wherein the shaft includes a stepped surface having a greater diameter than the deformable end;
    a housing wall defining a base;
    a support member extending transversely from the base, the support member having an opening extending therethrough for receiving the deformable end, the opening of the support member further including a pocket on one side of the support member;
    a nub disposed on the support member between the base and the opening, the nub extending transversely to the base along the support member towards the opening and projecting outwardly from the support member on a side opposite the pocket;
    a leaf seal pivotally mounted on the shaft; and
    a bias member coaxially arranged on the shaft and disposed between the head and the leaf seal, wherein the bias member exerts a force on the leaf seal;
    wherein the deformable end is deformed to occupy the pocket, and wherein the deformable end and the stepped surface provide a mechanical retainer to secure the stud to the support member; and
    wherein the nub is configured to position the leaf seal apart from a distal end of the support member.

2. The pin assembly as claimed in claim 1, wherein the stepped surface of the shaft is hardened via heat treatment.

3. The pin assembly as claimed in claim 1, wherein the stud includes a wear resistant coating.

4. The pin assembly as claimed in claim 1, wherein the support member includes an upper section and a lower section disposed proximal to the base in relation to the upper section, wherein the upper section comprises a single crystal material.

5. The pin assembly as claimed in claim 4, wherein the nub projects substantially orthogonally from the lower section of the support member and is configured to position the leaf seal apart from the upper section of the support member.

6. The pin assembly as claimed in claim 1, wherein the housing wall defining the base is part of a gas turbine engine disposed along a gas pathway between a combustor and a turbine, and wherein the leaf seal is operable to direct a gas flow onto rotor blades of the turbine.

7. The pin assembly as claimed in claim 1, wherein the pocket is conic shaped, and wherein at least part of the deformable end is melted and defines a melted portion occupying the conic shaped pocket without forming a material connection.

8. A leaf seal assembly of a structure, comprising:
a stud including a head, a shaft, and a deformable end disposed at a distal end thereof, wherein the shaft includes a stepped surface having a greater diameter than the deformable end;
a base defined by a housing wall of the structure, the base including a transversely extended support member, the support member having an opening extending therethrough for receiving the deformable end and a pocket arranged at a mouth of the opening on one side of the support member, the support member further including a nub disposed between the base and the opening, the nub extending transversely to the housing wall along the support member towards the opening on a side opposite the pocket;
a leaf seal pivotally mounted on the shaft; and
a bias member coaxially arranged on the shaft and disposed between the head and the leaf seal, wherein the bias member exerts a force on the leaf seal;
wherein the stepped surface of the shaft positions the stud in a predefined position with respect to the support member, and the deformable end is received in the pocket and is deformed to occupy the pocket to secure the stud to the support member; and
wherein the nub projects outwardly from the support member towards the head of the stud to position the leaf seal apart from a portion of the support member distal to the base.

9. The assembly as claimed in claim 8, wherein at least one of the stepped surface of the shaft is hardened via heat treatment and the stud includes a wear resistant coating.

10. The assembly as claimed in claim 8, wherein the bias member includes a wear resistant coating.

11. The assembly as claimed in claim 8, wherein the support member includes an upper section and a lower section, wherein the upper section defines the portion of the support member distal to the housing wall and comprises a single crystal material, and wherein the nub extends from the base towards the opening and projects outwardly from the lower section to facilitate positioning the leaf seal apart from the upper section.

12. The assembly as claimed in claim 8, wherein the structure is a gas turbine engine having a longitudinal center axis and the housing wall defining the base is disposed radially outwards from the longitudinal center axis, and wherein the nub extends transversely from the base along the support member and projects outwardly in an axial direction of the longitudinal center axis.

13. The assembly as claimed in claim 12, wherein the housing wall is disposed in a region of a gas flow path between a combustor and a turbine such that the leaf seal is arranged to direct combustion gases onto rotor blades of the turbine.

14. The assembly as claimed in claim 8, wherein the leaf seal is operable to engage an opposing member to seal off a gas pathway.

15. A method of forming a joint for a machine, comprising:
providing a stud, the stud including a head, a shaft, and a deformable end disposed at a distal end thereof, wherein the shaft includes a stepped surface having a greater diameter than the deformable end;
providing a base defined by a housing wall of the machine and including a support member extending transversely from the base for receiving the stud via an opening extending therethrough, the support member including an upper section and a lower section proximal to the base in relation to the upper section;
providing a leaf seal pivotally mounted on the shaft; and
providing a bias member coaxially arranged on the shaft and disposed between the head and the leaf seal, wherein the bias member exerts a force on the leaf seal;
forming a pocket at an end of the opening in the support member on one side of the support member;
inserting the deformable end through the opening, wherein the stepped surface of the shaft stops the stud in a predefined position with respect to the support member;
securing the stud to the support member via melting the deformable end in the pocket thereby forming a mechanical retainer within the pocket without forming a metallurgical joint between the stud and the pocket;
wherein providing the base and the support member includes forming a nub on the lower section extending transversely from the base along the support member towards the opening, wherein the nub projects substantially orthogonally from the lower section on a side of the support member opposite the pocket; and
wherein the nub is configured to position the leaf seal apart from a distal end of the support member.

16. The method as claimed in claim 15, further comprising at least one of applying a wear resistant coating to the stud and hardening the stepped surface of the shaft via a heat treatment.

17. The method as claimed in claim 15, wherein securing the stud to the support member via melting the deformable end in the pocket includes welding the deformable end to provide a melted portion occupying the pocket by filling the pocket with molten material of the deformable end and cooling the molten material to facilitate forming the mechanical retainer without forming the metallurgical joint.

* * * * *